United States Patent
Beneteau et al.

(10) Patent No.: US 7,952,046 B2
(45) Date of Patent: May 31, 2011

(54) RESISTANCE WELDING GUN WITH INDEPENDENT ACTUATORS

(75) Inventors: Michael J. Beneteau, Amherstburg (CA); D. Jeffrey Corbett, Amherstburg (CA); Mark J. Dolata, Amherstburg (CA)

(73) Assignee: Doben Limited (CA)

( * ) Notice: Subject to any disclaimer, the term of this patent is extended or adjusted under 35 U.S.C. 154(b) by 1006 days.

(21) Appl. No.: 11/743,744

(22) Filed: May 3, 2007

(65) Prior Publication Data

US 2008/0271565 A1    Nov. 6, 2008

(51) Int. Cl.
 B23K 11/10    (2006.01)
 B23K 9/32    (2006.01)
(52) U.S. Cl. .................... 219/86.33; 219/86.25
(58) Field of Classification Search ............... 92/22, 23, 92/62, 65; 219/86.25, 86.33, 86.41, 86.51, 219/86.7, 89, 90; 294/88; 74/89.23, 89.39
See application file for complete search history.

(56) References Cited

U.S. PATENT DOCUMENTS

| | | | |
|---|---|---|---|
| 2,568,228 A | 9/1951 | Forse | |
| 3,080,852 A | 3/1963 | Geyer | |
| 3,371,583 A | 3/1968 | Blatt | |
| 3,734,303 A | 5/1973 | Blatt | |
| 4,351,628 A | 9/1982 | Drexel et al. | |
| 4,457,212 A * | 7/1984 | Unger et al. | 92/18 |
| 4,686,870 A | 8/1987 | Mack | |
| 4,898,080 A | 2/1990 | Lieberman | |
| 5,193,430 A | 3/1993 | Ilgovsky | |
| 6,474,215 B1 | 11/2002 | Boyer et al. | |
| 2005/0274218 A1 * | 12/2005 | Birkel et al. | 74/473.24 |

* cited by examiner

*Primary Examiner* — Thomas R Hannon
*Assistant Examiner* — Phillip A Johnson
(74) *Attorney, Agent, or Firm* — Carlson, Gaskey & Olds PC

(57) ABSTRACT

An actuator assembly for a welding gun is provided that has at least three positions in the example. The actuator assembly includes separate working and retract actuators. The working actuator includes a working rod movable between first and second positions. The retract actuator includes a retract rod independently movable relative to the working rod between third and fourth positions. The retract actuator is external to and non-concentrically arranged relative to the working actuator in the example shown. Actuation of the working and retract actuators is coordinated to provide at least three positions while enabling the actuators to be changed or modified independently from one another. A latching device is configured to selectively interlock the working and retract actuators to one another automatically in response to movement the working rod from the first position to the second position.

12 Claims, 3 Drawing Sheets

RETURN

RETRACT

ADVANCE

RESISTANCE WELDING GUN WITH INDEPENDENT ACTUATORS

BACKGROUND

The application relates to an actuator assembly suitable for use with a resistance welding gun. More specifically the application relates to a resistance welding gun actuator assembly that incorporates an external retract mechanism and an adaptable welding cylinder.

Retracting welding guns are well known in the industry and are commonly applied when the welding gun must reach over the workpiece or tooling to weld on a far side. An intermediate or retracted electrode position eliminates the time that might be wasted to fully open the electrodes at each spot to be welded on the workpiece. Retracting welding guns are also used when the space inside of the workpiece or tool is constrained and does not permit full opening of the electrodes.

It is common to provide a single retract position in such welding guns. To properly position the resistance welding electrodes relative to the workpiece, the stroke of the retract cylinder may have to be adapted from time to time to accommodate such things as the specific access condition or length of the welding gun arms. In the prior art designs of singular construction where the retract and welding cylinders are integrated, such adaptations can result in a large number of actuators within a particular manufacturing plant. These actuators are also large and expensive because of the high degree of customization.

What is needed is an actuator assembly that is compact, easily adaptable between various applications and less expensive.

SUMMARY

An actuator assembly for a welding gun is provided that has at least three positions in the example. The actuator assembly includes separate working and retract actuators. The working actuator includes a working rod movable between first and second positions. The retract actuator includes a retract rod independently movable relative to the working rod between third and fourth positions. The retract actuator is external to and non-concentrically arranged relative to the working actuator in the example shown. Actuation of the working and retract actuators is coordinated to provide at least three positions while enabling the actuators to be changed or modified independently from one another.

A latching device is configured to selectively interlock the working and retract actuators to one another automatically in response to movement the working rod from the first position to the second position. As a result, a separate actuation device is not required to lock the working and retract actuators relative to one another.

These and other features of the application can be best understood from the following specification and drawings, the following of which is a brief description.

DETAILED DESCRIPTION OF THE PREFERRED EMBODIMENT

Figure 1:
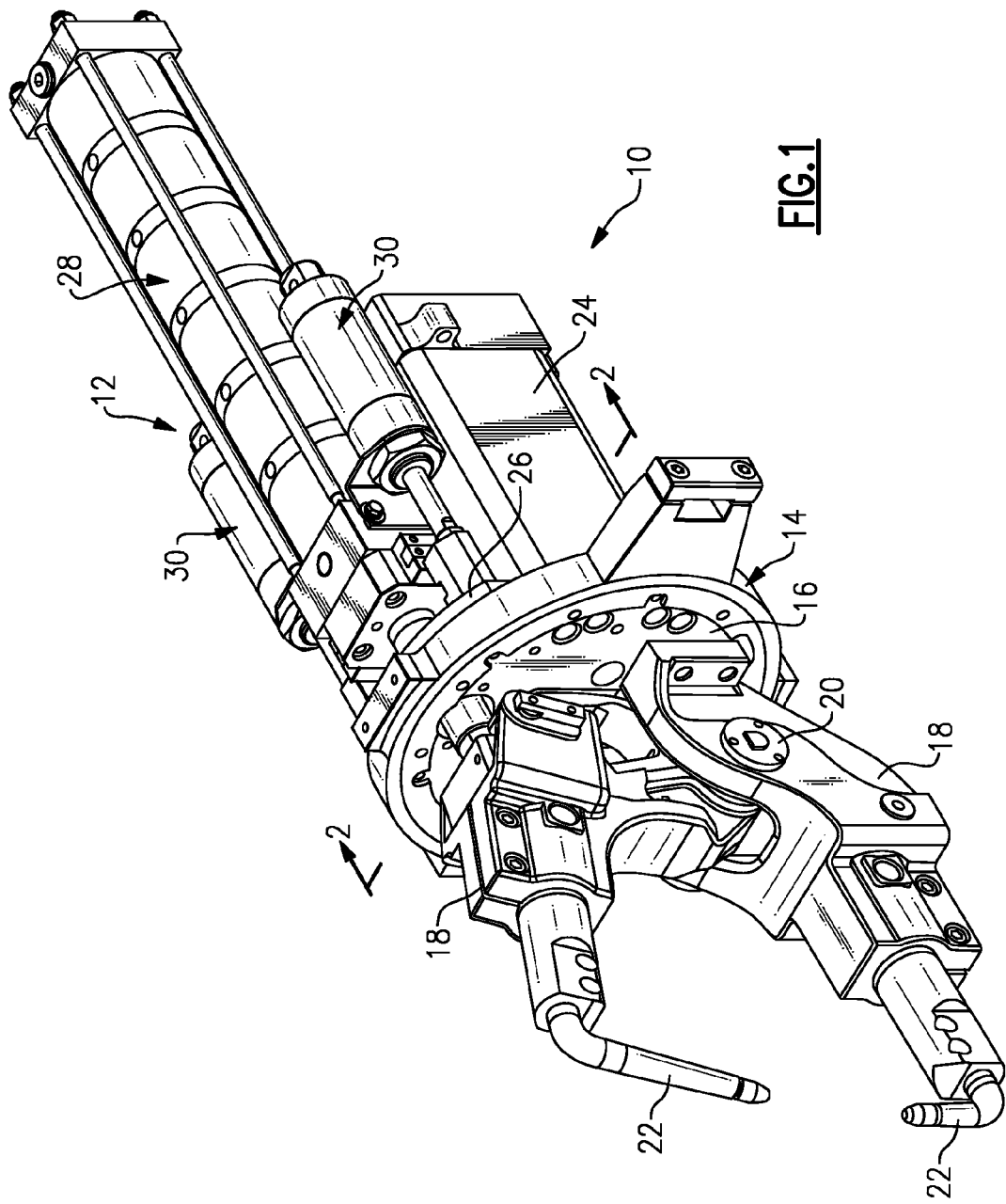
FIG. 1 is a schematic view of a welding gun with an example actuator assembly.

A welding gun 10 is shown in FIG. 1, which is manipulated using an example actuator assembly 12. It should be understood that, although the actuator assembly 12 is shown configured for use with a welding gun, the actuator assembly 12 also could be used with riveting tools, clinching and metal-working tools, and other applications.

The actuator assembly 12 is secured to a support 14 that includes a rotary bail 16, which rotationally orients the welding gun 10 relative to a workpiece (not shown) to a desired position. Opposing arms 18 rotate relative to one another about a pivot 20 to close electrodes 22 about the workpiece in a desired manner, as is known. In the example, one of the arms 18 is fixed and the other of the arms 18 is movable relative to the fixed arm. A transformer 24 supplies current to the electrodes 22 to spot-weld the workpiece.

Figure 4:
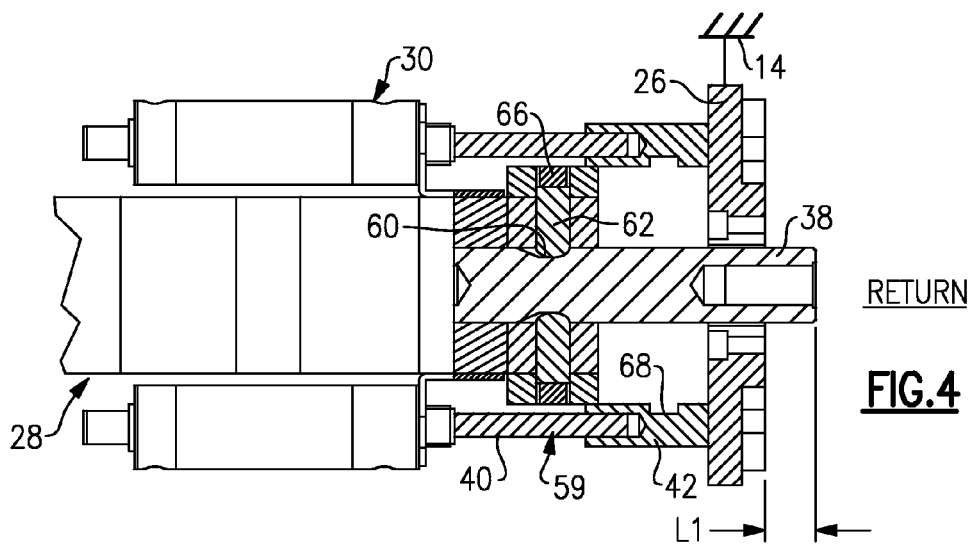
FIG. 4 is an enlarged cross-sectional view of the actuator assembly shown in FIG. 2 in a return position.
Figure 5:
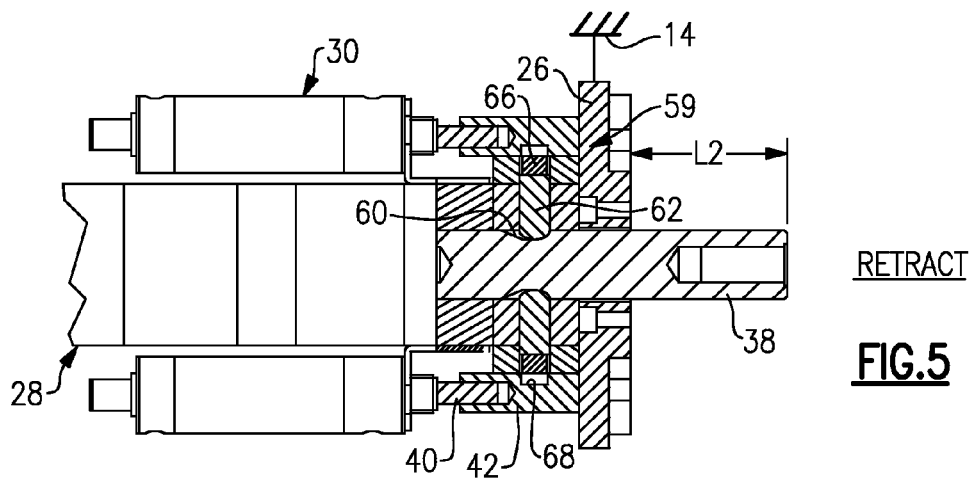
FIG. 5 is cross-sectional view of the actuator assembly shown in FIG. 4 in a retract position.
Figure 6:
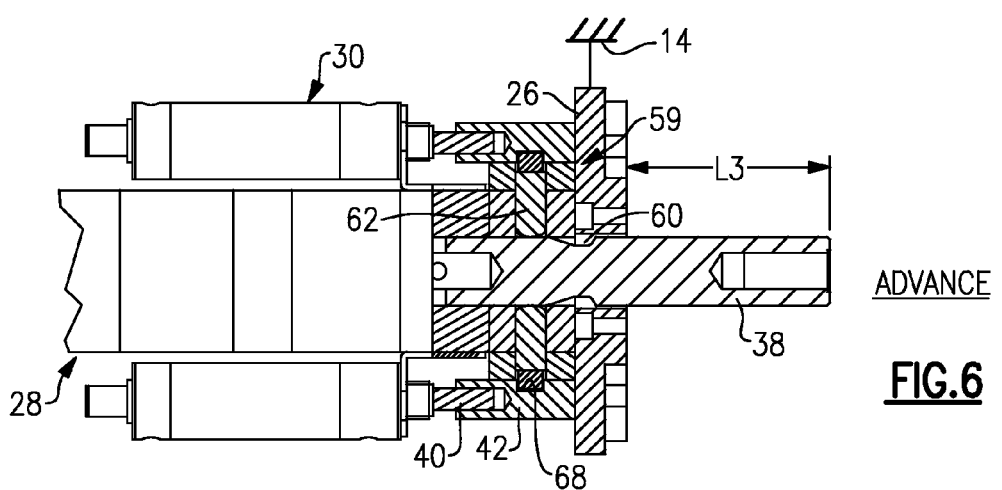
FIG. 6 is cross-sectional view of the actuator assembly shown in FIG. 4 in an advance position.

In one example configuration, the actuator assembly 12 includes a working actuator 28 and a retract actuator 30 that cooperate with one another to move the electrodes 22 between three or more positions (corresponding to L1-L3 shown in FIGS. 4-6). While a push-type arrangement is shown, it should be understood that the actuator assembly 12 could be configured to a pull-type configuration and still fall within the scope of this application. According, the terms "return," "retract" and "advance" are meant as relative positions and should be construed broadly. Furthermore, although the example working and retract actuators 28, 30 are illustrated as pneumatic cylinders, pneumatic, hydraulic, air-over-oil, electric servo actuators or any combination thereof may also be used.

Figure 2:
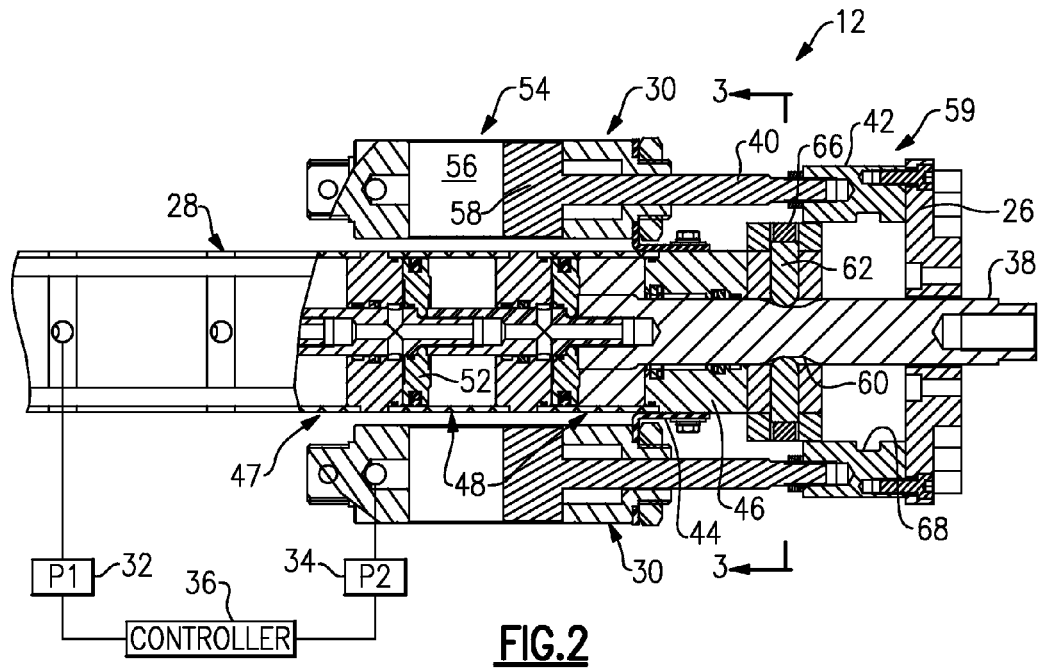
FIG. 2 is a cross-sectional view of the actuator assembly in FIG. 1 taken along line 2-2.

Referring to FIG. 2, first and second fluid sources 32, 34 selectively provide pressurized fluid to the working and retract actuators 28, 30 in response to commands from a controller 36. Of course, more or fewer fluid sources can be used in conjunction with control valves and vents may be employed to obtain desired movement of the working and retract actuators 28, 30, which is within the scope of one of ordinary skill in the art. The working and retract actuators 28, 30 are manipulated independently from one another and can be optimized separately based upon the particular application without requiring an entirely new integrated actuator, as required by the prior art.

The working and retract actuators 28, 30 respectively include working and retract rods 38, 40 that cooperate to manipulate the electrodes 22 through various positions. The working and retract rods 38, 40 are non-concentric and parallel in the example shown. An end of the working rod 38 is connected to the movable arm 18. In the example, a retract actuator 30 is arranged on each of opposing sides of the working cylinder 28. The number and size of the retract actuators 30 is selected based upon the particular application. The retract rods 40 are secured to the mounting plate 26 by blocks 42. The working rod 38 extends through an aperture in the mounting plate 26 between the blocks 42. Brackets 44 secure the retract actuators 30 to the working actuator 28.

The working actuator 28 includes a front block 46 that supports the working rod 38 for axial movement. In the example, the working actuator 28 includes an adaptable cylinder 47 having multiple sections 48, the number and size of which are selected based upon the desired force for the particular application. Each section 48 includes a cavity 50 having a piston 52 that is connected to the working rod 38. The working rod 38 is moved axially in fore and aft directions in response to selective pressurization of the chambers on either side of the pistons 52, as is known.

The retract actuator 30 includes a retract cylinder 54 that includes a piston 58 arranged in a cavity 56. The piston 58 is connected to the retract rod 40, which is moved axially in the fore and aft directions relative to the retract cylinder 54 in response to selective pressurization of the chambers on either side of the piston 58, as is known.

Figure 3:
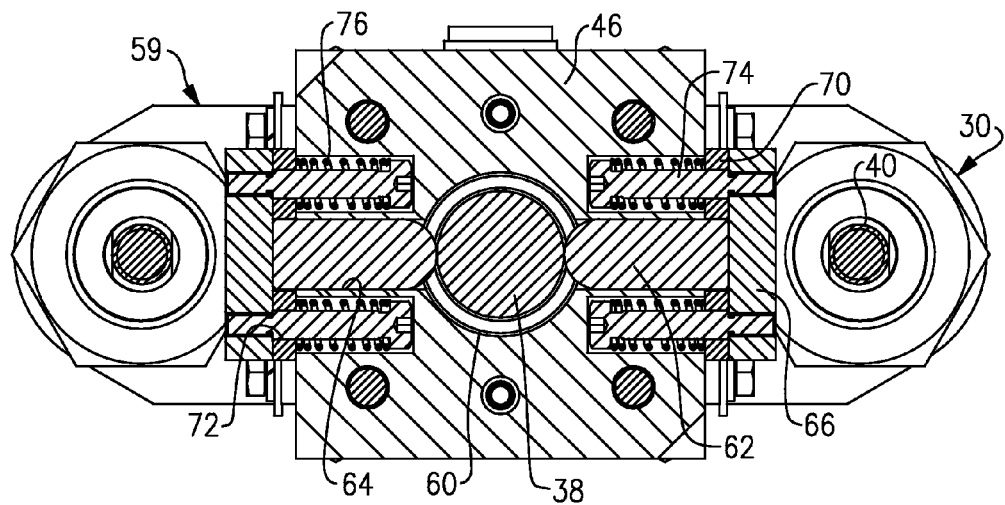
FIG. 3 is a cross-sectional view of the actuator assembly in FIG. 2 taken along line 3-3.

Referring to FIGS. 2 and 3, a latching device 59 is used to affix the front block 46 of the working actuator 28 relative to the mounting plate 26 once the retract actuators 30 have been moved from a return position (FIGS. 2 and 4) to a retract position (FIG. 5). The latching device 59 is shown unlatched in the retract position (FIG. 5) and latched in an advance position (FIG. 6). The retract actuators 30 are mechanically linked to the position of the working rod 38 through the latching device 59, which latches automatically, to obtain a desired response time and to eliminate separate control elements of some prior art arrangements.

The latching device 59 includes opposing plungers 62 received in bores 64 in the front block 46. The plungers 62 have inner ends that are in engagement with the outer surface of the working rod 38. The plungers 62 are arrange normal to the working rod 38 and are received in detents 60 in the outer surface when the working rod 38 is positioned as shown in the return and retract positions (FIGS. 4 and 5, respectively).

The plungers 62 include latches 66 supported at ends opposite the detents 60. The latches 66 are configured to engage recesses 68 in the blocks 42 when the plungers 62 are forced radially outward relative to the working rod 38 as the working rod moves axially to unseat the plungers 62 from the detents 60, as shown in the advance position (FIG. 6). Guide pins 74 are secured to each latch 66 and extend through holes 72 in a plate 70 that is secured to the front block 46. Springs 76 cooperate with the guide pins 74 to bias the latches 66 toward the detents 60.

Referring to FIGS. 4-6, the example actuator assembly 12 works by using two retract actuators 30 mounted independently of the main working actuator 28 to provide retract motion (FIG. 5) for the assembly, which provides an intermediate position for improved cycle times. FIG. 4 show the latches 66 in their retracted position with the ends of the plungers 62 resting in detents 60 in the working rod 38. When the retract actuators 30 are advanced as in FIG. 5, the latching device 59 is aligned so that the working rod 38 can be advanced and the latches 66 engaged. When the working rod 38 is advanced the detents 60 actuate the two plungers 62 that in turn cause the two latches 66 to lock the assembly into retract position. The working rod 38 then proceeds to advance the electrodes towards the workpiece as shown in FIG. 6.

Example operation of the welding gun 10 with the example actuator assembly 12 is as follows:

Return Position

Compressed air or other suitable fluid is applied to the return port of the retract cylinders 54 causing the retract rods 40 to extend to a point where the piston 58 is pressing against the end of the cylinder 54. In this position (FIG. 4) the distance between the moveable mounting plate 26 and the latching device 59 are at the maximum separation. At the same time the working actuator 28 has air from another fluid power valve acting against its piston 52, causing the working rod 38 to be fully returned (distance L1). The combination of both of these cylinder positions results in the maximum amount of welding electrode opening.

Retract (Intermediate) Position

The return port is vented to atmosphere while compressed air is applied to the retract port of the retract cylinders 54. This causes the retract rods 40 to retreat inside the retract cylinders 54 and to pull the mounting plate 26 relatively towards the latching device 59 (FIG. 5) moving the working rod 38 to a distance L2 relative to the mounting plate 26. This causes the welding electrodes 22 to move towards each other. During this motion the return air is maintained on the welding cylinder return port(s).

Advanced (Welding) Position

When the retract position has been achieved, compressed air is applied to the working actuator 28 to advance the working rod 38 to an axial distance L3. This causes the latches 66 to advance to prevent the working actuator 28 from working against the retract actuators 30. As the working rod 38 continues to advance, the welding electrodes 22 are brought into contact with the workpiece with sufficient force to conduct the resistance welding process.

Return Position Subsequent to Advanced Position

At the completion of the welding process, if the fully returned position of the electrodes 22 is desired, the retract and weld stroke ports are vented to atmosphere and air is applied to the return ports. Once the working rod 38 has started to return causing the latching device 59 to disengage, the retract cylinder return port can be pressurized, thereby fully returning the unit. If opening the welding gun only to the retracted position is desired, the air is retained on the retract advance port and the air is applied to the welding cylinder return port. This will retract the electrodes 22 sufficiently to allow moving to the next weld position.

Although an example embodiment has been disclosed, a worker of ordinary skill in this art would recognize that certain modifications would come within the scope of the claims. For that reason, the following claims should be studied to determine their true scope and content.

What is claimed is:

1. An actuator assembly for a welding gun comprising:
   a working actuator including a working rod movable between first and second positions, wherein an end of the working rod is connected to movable arm that has a welding electrode;
   a retract actuator including a retract rod independently movable relative to the working rod between third and fourth positions, the retract actuator non-concentrically arranged relative to the working actuator; and
   a latching device configured to selectively interlock the working and retract actuators to one another in response to movement of one of the working and retract rods from one of the positions to another of the positions.

2. The actuator assembly according to claim 1, wherein the working actuator includes a cylinder with the working rod arranged in the cylinder, the retract actuator arranged outside of the cylinder.

3. The actuator assembly according to claim 1, wherein the working actuator includes a front block supporting the working rod, the latching device extending between the working rod and the retract rod, the working and retract rods parallel to one another.

4. The actuator assembly according to claim 3, wherein the latching device includes a plunger arranged in the front block, the retractor actuator is connected to a block secured to a mounting plate through which the working rod extends, the plunger and the block cooperating with one another in a latched position to lock the working and retract actuators to one another, the working actuator movable relative to the retract actuator between the third and fourth positions to align the plunger with the block.

5. An actuator assembly for a welding gun comprising:
 a working actuator including a working rod movable between first and second positions, wherein an end of the working rod is connected to movable arm that has a welding electrode;
 a retract actuator including a retract rod independently movable relative to the working rod between third and fourth positions, the retract actuator supported relative to the working actuator; and
 a latching device configured to selectively interlock the working and retract actuators to one another automatically in response to movement of one of the working and retract rods from one of the positions to another of the positions.

6. The actuator assembly according to claim 5, wherein the latching device includes a plunger that cooperates With a detent in the working rod, the plunger seated in the detent in the first position and unseated from the detent and driven outward by the working rod in the second position.

7. The actuator assembly according to claim 6, wherein a spring biases the plunger into engagement with the detent in the first position.

8. An actuator assembly for a welding gun comprising:
 a working actuator including a working rod movable between first and second positions;
 a retract actuator including a retract rod independently movable relative to the working rod between third and fourth positions, the retract actuator non-concentrically arranged relative to the working actuator; and
 a latching device configured to selectively interlock the working and retract actuators to one another in response to movement of one of the working and retract rods from one of the positions to another of the positions, wherein the working rod extends through a mounting plate, and the retract actuator is interconnected between the working actuator and the mounting plate, the mounting plate arranged near the working actuator in the third position and farther from the working actuator in the fourth position than in the third position.

9. The actuator assembly according to claim 8, wherein latching device locks the working actuator relative to the retract actuator in the fourth position in a latched position.

10. The actuator assembly according to claim 9, wherein the working rod includes an end that is near the mounting plate in the first position and farther from the mounting plate in the second position than the first position.

11. An actuator assembly for a welding gun comprising:
 a working actuator including a working rod movable between first and second positions;
 a retract actuator including a retract rod independently movable relative to the working rod between third and fourth positions, the retract actuator supported relative to the working actuator;
 a latching device configured to selectively interlocking the working and retract actuators to one another automatically in response to movement of one of the working and retract rods from one of the positions to another of the positions, wherein the latching device includes a plunger that cooperates with a detent in the working rod, the plunger seated in the detent in the first position and unseated from the detent and driven outward by the working rod in the second position; and
 a portion of the working actuator extending through the mounting plate, the plunger engaging the block to lock the working and retract actuators to one another when in the second position.

12. The actuator assembly according to claim 11, wherein the block includes a recess and the plunger includes a latch that is received in the recess in a latched position, the latch and recess aligned in the fourth position and misaligned with one another in the third position.

* * * * *

UNITED STATES PATENT AND TRADEMARK OFFICE
CERTIFICATE OF CORRECTION

| | | |
|---|---|---|
| PATENT NO. | : 7,952,046 B2 | Page 1 of 1 |
| APPLICATION NO. | : 11/743744 | |
| DATED | : May 31, 2011 | |
| INVENTOR(S) | : Michael J. Beneteau et al. | |

It is certified that error appears in the above-identified patent and that said Letters Patent is hereby corrected as shown below:

IN THE CLAIMS:

Claim 6, column 5, line 19: "With" should read as --with--

Signed and Sealed this
Sixth Day of September, 2011

David J. Kappos
*Director of the United States Patent and Trademark Office*